United States Patent Office 2,736,689
Patented Feb. 28, 1956

2,736,689

HYDROGENATION OF UNSATURATED HYDROCARBONS EMPLOYING A METAL SULFIDE CATALYST HAVING A NITROGENOUS BASE CHEMISORBED THEREON

Archibald P. Stuart, Media, Pa., assignor to Sun Oil Company, Philadelphia, Pa., a corporation of New Jersey No Drawing. Application January 27, 1951,
Serial No. 208,232

17 Claims. (Cl. 196—78)

This invention relates to new catalytic compositions. More particularly, the invention relates to new hydrogenation catalysts and to processes for their use.

Various metallic sulfides, either alone or deposited on a carrier, have heretofore been employed in hydrogenation reactions. The carriers heretofore successfully employed in hydrogenation processes are, in general, those which exhibit substantially no acidic properties, such as titania, alumina, and magnesia, and such carriers generally contain silica, if at all, in only minor and incidental quantities or combined in an inactive form. The choice of carriers for hydrogenation reactions has thus been rather limited. Activators for such catalysts such as metallic oxides, halides, and the like, have been described. Such catalysts and catalytic compositions, however, are usually subject to one or more difficulties which prevent their use in commercial operations. For example, such catalysts are expensive to prepare, or are not sufficiently effective to cause hydrogenation of difficulty hydrogenatable hydrocarbons, such as aromatics, without the use of relatively drastic conditions, and the use of such drastic conditions causes undesired reactions, such as cracking. Also, heretofore described catalysts are often rapidly deactivated in the hydrogenation reactions, and regeneration is difficult and expensive.

An object of the present invention is to produce a highly effective inexpensive hydrogenation catalyst. A further object is to provide a catalyst which may be employed for long periods of time without deactivation. Another object is to provide a catalyst effective in hydrogenation reactions wherein only relatively mild conditions are required. A further object is to provide an effective hydrogenation catalyst including a siliceous material as the carrier. A still further object is to provide a process for the use of the present novel catalyst.

It has now been found that by incorporating a small amount of a nitrogen-containing organic base on a hydrogenation catalyst comprising a metal sulfide deposited on a carrier produces a catalytic composition remarkably effective in hydrogenation processes. It has been further found that this catalytic composition is inexpensive, has a long life, and is effective for the hydrogenation of unsaturated hydrocarbons under relatively mild conditions.

In accordance with the present invention, a metallic sulfide is deposited on a carrier and the resulting composition treated with an organic nitrogenous base. The effective quantity of the base is that amount which is chemisorbed by the catalyst, and the so-formed composition is the catalyst of the present invention.

By the expression "chemisorbed," and terms of similar import, as used herein, is meant that quantity of nitrogenous base adsorbed on the catalyst which is held by bonds stronger than mere physical adsorption. Thus, physically adsorbed base may be relatively readily removed by desorption, whereas the chemisorbed base can be removed only by resort to relatively drastic conditions. For example, the portion of organic base held by physical adsorption is readily removed by maintaining the composition at a temperature above the boiling point and below the decomposition point of the base in a stream of an inert gas for time sufficient to achieve desorption, from about 1 to 6 hours usually being sufficient. The chemisorbed portion of the organic base is not affected by this operation.

The metal sulfides which may be employed as the hydrogenation catalysts are the sulfides of the metals of groups 2 through 8 of the periodic table, and preferably of the metals of group 6 or 8. Preferred metal sulfides are the sulfides of iron, cobalt, nickel, molybdenum, chromium, tungsten, and vanadium. These metal sulfides may be deposited on carriers heretofore employed including, for example, bauxite, alumina, silica gel, mixtures of alumina and silica gel including physical mixtures and coprecipitated compositions, and the like. The present invention has been found to be especially valuable where an acid type carrier is used, and preferably where the carrier is a siliceous carrier, i. e., a carrier having silica as a component thereof. Thus, while the invention may be employed with carriers heretofore used, it is of special value with siliceous or acid type carriers heretofore considered undesirable for use in hydrogenation processes. A preferred embodiment of the present invention comprises using as the carrier a spent cracking catalyst. In patent application Serial No. 200,700, filed December 13, 1950, now Patent No. 2,635,081, there is described and claimed a catalytic composition comprising molybdenum disulfide deposited on a spent cracking catalyst, and the further treatment of this composition with an organic nitrogenous base in accordance with the present invention constitutes a preferred embodiment thereof. As described in said patent application Serial No. 200,700, the spent cracking catalyst is preferably a catalyst consisting of silica and alumina which has been employed for the catalytic cracking of hydrocarbons until the cracking activity in the cracking operation has decreased at least about 30% below its initial value, so that regeneration for further use in cracking is not feasible. Silica-alumina cracking catalysts are well known, and generally contain a ratio of silica to alumina of 1:1 to 15:1 and preferably from 70% to 80% silica, from 30% to 10% alumina, and not more than 10% of other metallic oxides.

The organic nitrogenous bases which may be employed are the organic nitrogen-containing compounds having a basic reaction, or a nitrogen-containing compound which is converted thereto under the conditions of the hydrogenation processes such as butyl cyanide and cyclohexanone oxime. It is preferred to employ an organic base wherein a nitrogen atom is connected in a ring which may be of aromatic or aliphatic character. Examples of preferred organic bases are quinoline, pyridine, quinaldine, piperidine, and pyrrole. Other organic nitrogenous bases which may be employed with good results include, for example, aniline, toluidine, decylamine, and other amines. The nitrogen base should not be decomposed under the conditions of hydrogenation and hence bases wherein the nitrogen atom is connected to a tertiary carbon atom are not preferred. Preferred nitrogenous bases are those wherein the nitrogen atom is connected to a primary or secondary carbon atom or atoms, and which have from 4 to 16 carbon atoms per molecule.

The present catalyst is prepared by first depositing a metallic sulfide on a carrier which may be accomplished as heretofore known. For example, molybdenum disulfide is deposited on a carrier such as bauxite or a spent cracking catalyst by impregnating the carrier with an aqueous solution of ammonium molybdate, treating the impregnated carrier with hydrogen sulfide and heating the so-treated composition in an atmosphere of hydrogen. In accordance with the present invention, this composition should contain from 10% to 25% by weight of the metal sulfide. The so-prepared composition is then treated with an organic nitrogenous base. This may be conveniently accomplished by passing a stream of an inert gas admixed with vapors of the organic base over the catalyst at an elevated temperature, preferably from 100° C. to 500° C. The physically adsorbed base may then be removed by continuing the contact, at an elevated temperature, with the stream of inert gas without the added vapors of the base. This causes desorption of the physically adsorbed base leaving the chemisorbed base attached to the catalytic composition. Other methods may be employed, such as dipping the catalyst in the liquid or liquefied base, or in a solution thereof, and thereafter heating preferably in a vacuum or in a stream of inert gas to desorb the physically adsorbed base. Only a relatively small amount of organic base is chemisorbed and such small amount results in a large increase in hydrogenation efficicacy. The amount of chemisorbed base will vary somewhat to the carrier employed, but will usually be between 0.01 and 0.2 milliequivalent per gram of metal sulfide-carrier. With preferred nitrogenous bases having from 4 to 16 carbon atoms per molecule, the quantity of chemisorbed base corresponding to these milliequivalent values will be from 0.065 to 4.5% by weight of the final composition. All of the physically adsorbed base need not be removed since a small amount thereof does not cause deleterious effects in the hydrogenation process. Excessive amounts of physically adsorbed base tend to be removed or desorbed from the composition during hydrogenation and may contaminate the product.

In accordance with the present invention, it is essential that the catalyst be treated with the nitrogenous base prior to its use in hydrogenation processes, i. e., the addition of a nitrogenous base to an oil and subsequent hydrogenation thereof does not give comparable results, and may exhibit deleterious effects as shown in the following examples.

The catalysts of the present invention are especially suitable for the hydrogenation of the aromatic constituents of petroleum fractions. For example, the properties of lubricating oil containing aromatic hydrocarbons may be improved by hydrogenating in accordance with the present invention. It is especially advantageous to hydrogenate one-pass gas oil to improve the crackability thereof. For example, hydrogenation of a one-pass gas oil having a boiling point of from about 400 to 700° F. and containing from 30% to 50% aromatic hydrocarbons, principally polynuclear aromatics such as naphthalenes, to convert a portion thereof to tetralins and decalins, and subsequent cracking results in an increase in the gasoline yield and a decrease in coke formation. Other unsaturated hydrocarbons, such as olefins and acetylenes, and hydrocarbon mixtures containing such unsaturated hydrocarbons, may advantageously be hydrogenated in the presence of the present catalyst.

The catalysts of the present invention are effective for the hydrogenation of aromatic hydrocarbons, such as naphthalenes, under relatively mild conditions, the optimum conditions for a given application being dependent upon the charge stock, the degree of hydrogenation desired, and the like. In general, using the present catalysts, hydrogenation is advantageously obtained by using a hydrogen pressure of from 500 to 1,800 p. s. i., and preferably from 1,000 to 1,600 p. s. i., and a temperature of from 200° C. to 400° C., and preferably from 250° C. to 360° C. Higher temperatures and pressures can be used, so long as the operating variables are maintained within hydrogenating conditions.

The following examples illustrate preferred embodiments of the present invention which is not necessarily to be considered as limited thereby.

*Example 1*

In order to demonstrate the effectiveness of the present catalyst and the process of the present invention, a spent silica-alumina cracking catalyst was coated with 21.4% molybdenum disulfide. The spent cracking catalyst consisted of about 75% silica and about 25% alumina and had been employed for about 6 months in a commercial installation involving the catalytic cracking of a gas oil. During the period of cracking, the catalyst had been subjected to about 10,000 regenerations and the initial activity of 45 decreased so that regeneration restored an activity of 29, i. e. the catalytic activity decreased by 35.6%. Catalytic activity was measured by the method described by Alexander, Proceedings Am. Pet. Inst. 27 (III) 51 (Nov. 1947). An analysis of the spent catalyst showed the presence of minor amounts of various metals including at least about 0.1% to 1% of titanium, vanadium, and iron, and at least about 0.001% to 0.1% chromium, and at least about 0.01% to 1% nickel. This spent catalyst was impregnated with an aqueous solution of ammonium molybdate. Water was expelled by gentle heating, the resulting mass treated with hydrogen sulfide to convert the ammonium compounds to ammonium thiomolybdate. The composition was then heated to 300° C. in an atmosphere of hydrogen to convert the thiomolybdate to the disulfide. The final composition contained 21.4% molybdenum disulfide.

A portion of the so-prepared catalyst was treated with vapors of quinoline at 300° C. in a stream of nitrogen. This was accomplished by the dropwise addition of quinoline to the heated catalyst maintained in a stream of nitrogen. Excess quinoline, i. e. the quinoline not chemisorbed, was removed by passing a stream of nitrogen over the catalyst, at 300° C., for 4 hours.

Both of the catalysts were used to hydrogenate one-pass catalytic gas oil having a refractive index $n_D^{20} = 1.4940$, a density $d_4^{20} = 0.8723$ and containing by weight 65% saturates, 32% naphthalenes, and 3% tetralins and boiling between 439° F. and 654° F. In saturating aromatic bonds, e. g. in hydrogenating naphthalene to tetralin and decalin, the refractive index of the hydrocarbon mixture is decreased and this decrease in refractive index constitutes a measure of the degree of hydrogenation. Operating conditions were 1,500 p. s. i. at a temperature of 340° C. and a space rate (liquid hourly space velocity) of 1. A decrease in the refractive index $(n_D^{20} \times 10^4)$ of 181 was observed for the catalyst not treated with quinoline, whereas a decrease of 200 was observed for the quinoline treated catalyst. This indicates a substantial amount of hydrogenation wherein naphthalenes were converted to tetralins. The product obtained with the catalyst not treated with quinoline contained about twice the concentration of unconverted naphthalenes as did the product obtained from the process using the quinoline treated catalyst.

Thus, while molybdenum sulfide deposited on a spent cracking catalyst serves as a good hydrogenation catalyst, treatment thereof with quinoline in accordance with the present invention produces a markedly superior catalyst.

*Example 2*

Example 1 was duplicated using bauxite as the carrier in place of spent cracking catalyst. The refractive index $(n_D^{20} \times 10^4)$ change with quinoline treated catalyst was 21 units greater than the change observed with untreated catalyst.

*Example 3*

A catalyst consisting of 21.4% molybdenum sulfide deposited on alumina was prepared as described in Example 1. To the same catalytic gas oil of Example 1 was added 0.5 volume percent of quinoline and the mixture was hydrogenated in contact with the above catalyst at a temperature of 340° C. and pressure of 1,500 p. s. i. The refractive index change with added quinoline was $45 \times 10^{-4}$ units less than when quinoline was not added, showing that hydrogenation was retarded by the so-added quinoline. This deleterious effect was not observed when the catalyst was treated, prior to the hydrogenation process, so that quinoline was chemisorbed thereon.

In the foregoing examples, which include runs of more than 24 hours, no decrease in hydrogenating activity of the quinoline treated catalysts was observed.

The invention claimed is:

1. An improved hydrogenating catalytic composition prepared by depositing on an acid type carrier from 10% to 25% of a metal sulfide selected from the group consisting of iron sulfide, cobalt sulfide, nickel sulfide, molybdenum sulfide, chromium sulfide, tungsten sulfide, and vanadium sulfide, and treating the resulting composition under non-hydrogenating conditions with an organic nitrogenous base having from 4 to 16 carbon atoms per molecule for a time sufficient to chemisorb said base thereon in an amount effective to increase hydrogenating activity of said resulting composition 2. An improved hydrogenating catalytic composition according to claim 1 wherein said organic nitrogenous base is selected from the group consisting of quinoline, pyridine, quinaldine, piperidine, and pyrrole.

3. An improved hydrogenating catalytic composition according to claim 1 wherein said acid type carrier is a siliceous carrier.

4. An improved hydrogenating catalytic composition according to claim 1 wherein said acid type carrier is a spent cracking catalyst.

5. An improved hydrogenating catalytic composition according to claim 1 wherein said acid type carrier is bauxite.

6. An improved hydrogenating catalytic composition prepared by depositing on a spent cracking catalyst from 10% to 25% molybdenum disulfide and treating the resulting composition under non-hydrogenating conditions with an organic nitrogenous base having from 4 to 16 carbon atoms per molecule for a time sufficient to chemisorb from 0.065 to 4.5% of said base thereon, said spent cracking catalyst comprising a silica-alumina composition previously utilized as the catalyst in a process for cracking hydrocarbons until its cracking activity in the cracking operation had decreased at least 30% below its initial activity.

7. An improved hydrogenating catalytic composition according to claim 6 wherein said organic nitrogenous base is quinoline.

8. An improved hydrogenating catalytic composition prepared by depositing on bauxite from 10% to 25% molybdenum disulfide and treating the resulting composition under non-hydrogenating conditions with an organic nitrogenous base having from 4 to 16 carbon atoms per molecule for a time sufficient to chemisorb from 0.065 to 4.5% of said base thereon.

9. An improved hydrogenating catalytic composition according to claim 8 wherein said organic nitrogenous base is quinoline.

10. Process for the hydrogenation of unsaturated hydrocarbons which comprises contacting said unsaturated hydrocarbons under hydrogenating conditions with a catalytic composition prepared by depositing on an acid type carrier from 10% to 25% of a metal sulfide selected from the group consisting of iron sulfide, cobalt sulfide, nickel sulfide, molybdenum sulfide, chromium sulfide, tungsten sulfide, and vanadium sulfide, and treating the resulting composition under non-hydrogenating conditions with an organic nitrogenous base for a time sufficient to chemisorb thereon said base in an amount effective to increase hydrogenating activity of said resulting composition.

11. Process according to claim 10 wherein said metal sulfide is molybdenum sulfide.

12. Process according to claim 10 wherein said organic nitrogenous base is quinoline.

13. Process for the hydrogenation of unsaturated hydrocarbons which comprises contacting said unsaturated hydrocarbons under hydrogenating conditions with a composition prepared by depositing from 10% to 25% molybdenum sulfide on a spent cracking catalyst and treating the resulting composition under non-hydrogenating conditions with quinoline for a time sufficient to chemisorb thereon from 0.065 to 4.5% quinoline.

14. Process for the hydrogenation of unsaturated hydrocarbons which comprises contacting said unsaturated hydrocarbons under hydrogenating conditions with a composition prepared by depositing from 10% to 25% molybdenum sulfide on bauxite and treating the resulting composition with quinoline for a time sufficient to chemisorb thereon from 0.065 to 4.5% quinoline.

15. Process for the preparation of an improved hydrogenating catalytic composition which comprises depositing a metal sulfide selected from the group consisting of iron sulfide, cobalt sulfide, nickel sulfide, molybdenum sulfide, chromium sulfide, tungsten sulfide, and vanadium sulfide on an acid type carrier, and treating the resulting composition under non-hydrogenating conditions with an organic nitrogenous base in vapor phase for a time sufficient to chemisorb said nitrogenous base in an amount effective to increase the hydrogenating activity of said resulting composition.

16. Process for the preparation of an improved hydrogenating catalytic composition which comprises depositing from 10% to 25% molybdenum sulfide on bauxite and treating the resulting composition under non-hydrogenating conditions with quinoline in the vapor phase under non-hydrogenating conditions for a time sufficient to chemisorb from 0.065 to 4.5% by weight quinoline.

17. Process for the preparation of an improved hydrogenating catalytic composition which comprises depositing from 10% to 25% molybdenum sulfide on a spent cracking catalyst and treating the resulting composition under non-hydrogenating conditions with quinoline in the vapor phase for a time sufficient to chemisorb from 0.065 to 4.5% by weight quinoline.

References Cited in the file of this patent

UNITED STATES PATENTS

| | | |
|---|---|---|
| 2,332,276 | Stahly | Oct. 19, 1943 |
| 2,366,724 | Gardner | Jan. 9, 1945 |
| 2,429,575 | Appleby et al. | Oct. 21, 1947 |
| 2,550,531 | Ciapetta | Apr. 24, 1951 |